United States Patent [19]

Dahl

[11] Patent Number: 4,943,196
[45] Date of Patent: Jul. 24, 1990

[54] SWAGED COLLAR FASTENER
[75] Inventor: Warren Dahl, Philadelphia, Pa.
[73] Assignee: SPS Technologies, Inc., Newtown, Pa.
[21] Appl. No.: 87,374
[22] Filed: Aug. 20, 1987
[51] Int. Cl.$^5$ ............................................. F16B 19/00
[52] U.S. Cl. ....................................... 411/361; 411/43; 403/408.1
[58] Field of Search ...................... 411/43, 69, 70, 361; 29/532.2; 403/408.1

[56] References Cited

U.S. PATENT DOCUMENTS

| | | |
|---|---|---|
| Re. 30,445 | 12/1980 | Ruhl . |
| 3,203,300 | 8/1965 | Marschner ........................ 411/361 |
| 3,215,024 | 11/1965 | Brilmyer et al. . |
| 3,464,306 | 9/1969 | Reynolds et al. ................. 411/361 |
| 3,560,124 | 2/1971 | Bergere ............................. 411/361 |
| 4,112,811 | 9/1978 | King .................................. 411/361 |
| 4,197,782 | 4/1980 | Champoux ........................ 411/361 |
| 4,221,152 | 9/1980 | Jason . |
| 4,324,518 | 4/1982 | Dixon ................................ 411/361 |
| 4,472,096 | 9/1984 | Ruhl et al. ........................ 411/361 |
| 4,544,312 | 10/1985 | Stencel ............................. 411/361 |

Primary Examiner—Neill R. Wilson
Attorney, Agent, or Firm—James D. Dee; Aaron Nerenberg

[57] ABSTRACT

Predetermined limits are attained for the peak loads encountered when a composite assembly of workpieces is secured with a swaged collar fastener, by disposing cavities in the cylindrical wall of the fastener collar to receive material flow during the swaging operation. Rotation between the collar and pin of the fastener is precluded by disposing abutting portions on the pin, which interface against the swaged material of the collar. Fastener cost reductions are achieved by decreasing the volume of a post-swage scrap portion on the pin and by concurrently fabricating grooves thereon with a rolling die, for various functional purposes. Swaging tool malfunction is avoided by eliminating land surfaces adjacent to grooves on the pin through which pull is applied thereto with the tool.

33 Claims, 3 Drawing Sheets

SWAGED COLLAR FASTENER

BACKGROUND OF THE INVENTION

This invention relates generally to swaged collar fasteners and more particularly to pull type swaged collar fasteners which have breakoff pintails thereon to provide a gripping means for the swaging tool.

The fasteners to which this invention relates include a headed pin with locking grooves disposed thereon and a collar having a cylindrical wall. When such fasteners are utilized to secure a composite assembly of workpieces, the pin is disposed into aligned holes through the workpieces to be secured in the composite assembly and the collar is disposed about the pin over the locking grooves thereof. Then the cylindrical wall of the collar is radially compressed into the locking grooves to affix the collar on the pin. Various tools are available for this collar wall compression operation with the most common being a swaging tool which pulls the pin in one direction while forcing a swage anvil over the collar in the other direction to forceably clinch the workpieces of the composite assembly together while affixing the collar to the pin. The pull is applied to the pin through a pintail disposed on one end thereof, which is broken off and discarded as scrap, after the collar has been affixed to the pin.

One problem encountered with swaged collar fasteners is that success of the collar wall compression operation in filling the pin locking grooves with material from the collar, cannot be guaranteed by design of the fastener. This operation depends on so many variables, such as the relative hardness and shear strengths of the materials in the pin and collar, the dimensional tolerances of both the pin and collar, the elasticity of the pin and etc., that previous attempts to predetermine and assure such success have all generally failed. Such failure is attested to by the "overpacking" approach that is taken to the problem in U.S. Pat. No. 4,472,096 and the head dishing approach which is utilized to provide "physical evidence" that a composite assembly is being secured by a swaged collar fastener in U.S. Pat. No. 4,324,518. When success of the collar wall compression operation is assured without regard for the peak loads which are attendant to the "overpacking" approach, damage often occurs to the fastener pin and/or the workpieces being assembled thereby, to frustrate such success. This is particularly true when the aligned holes for the fastener pin are disposed through thin and/or nonmetallic materials, such as woven graphite-epoxy composites.

A chamfer has been utilized at one end of the collar bore to provide very limited stress relief for the collar wall compression operation, as disclosed in U.S. Pat. No. 3,215,024. However, the volume of such chamfers is too small to receive the amount of material flow that is necessary to cope with the many variables affecting the collar wall compression operation, which were mentioned previously. Furthermore, stress relief distribution over the collar during that operation is impossible with the chamfer approach. Therefore, widely varying peak loads are encountered therewith at different locations on the collar.

Another problem encountered with swaged collar fasteners is that vibrations passing through the composite assembly can cause the fastener collar to turn on the fastener pin. Where annular locking grooves are utilized on the fastener pin, such collar turning presents little adverse affect in low vibration environments for some time, until such locking grooves and/or the collar material therebetween starts to wear away and the collar loosens to eliminate the clinching force that tightly retains the workpieces in the composite assembly. Of course, in a high vibration environment such wear would be greatly accelerated and the collar loosening would occur in a relatively short time. Where helical locking grooves are utilized on the pin, the collar will only turn in one direction but any such turning will immediately eliminate the clinching force retaining the workpieces in the composite assembly because the collar will immediately loosen on the pin.

When the pin is fabricated from expensive materials, such as titanium alloys, the use of a pintail thereon is always viewed with some apprehension because it serves no useful purpose after the collar is affixed to the pin and in most composite assemblies is removed and discarded as scrap. As is presently known, what had been accepted in the past as the required length of a pintail, has now been reduced and U.S. Pat. No. 4,221,152 provides one solution to the land hangup problem encountered with a conventional swaging tool due to that reduced pintail length. However, other solutions to this problem and other approaches to reducing the volume of material in the pintail would certainly gain immediate adoption by the fastener industry.

SUMMARY OF THE PRESENT INVENTION

It is the general object of the present invention to enhance the overall reliability of a swaged collar fastener and to reduce the unit cost thereof.

It is a specific object of the present invention to reliably limit the peak loads applied when affixing a fastener collar on a fastener pin to secure a composite assembly with a swaged collar fastener.

It is another specific object of the present invention to reliably preclude rotation between a fastener collar and a fastener pin after affixment therebetween has been accomplished to secure a composite assembly with a swaged collar fastener.

It is still another specific object of the present invention to reduce the unit cost of a swaged collar fastener by reduced the volume of material in the fastener pin thereof.

In regard to limiting the peak loads which are attained, these and other objects are accomplished by disposing at least one cavity in the fastener collar for receiving collar material during the collar wall compression operation and thereby preclude the buildup of peak loads beyond a predetermined level. These and other objects are accomplished in regard to the preclusion of rotation between the fastener collar and fastener pin by including at least one abutting portion on the fastener pin locking grooves which interfaces against the swaged collar when torque develops between the fastener collar and fastener pin. As to the reduced unit cost of a swaged collar fastener, these and other objects are accomplished by significantly reducing the diameter of the pintail on the fastener pin relative to the diameter of the locking grooves thereon or concurrently fabricating the locking grooves thereon with pull grooves on the pintail thereof as a single operation.

The scope of the invention is only limited by the appended claims for which support is predicated on the preferred embodiments hereinafter set forth in the following description and the attached drawings.

BRIEF DESCRIPTION OF THE DRAWINGS

FIG. 3b is a side view of the fastener collar embodiment illustrated in FIG. 3a;

FIG. 4b is a side view of the fastener collar embodiment illustrated in FIG. 4a;

DETAILED DESCRIPTION OF THE PREFERRED EMBODIMENTS

Figure 1:
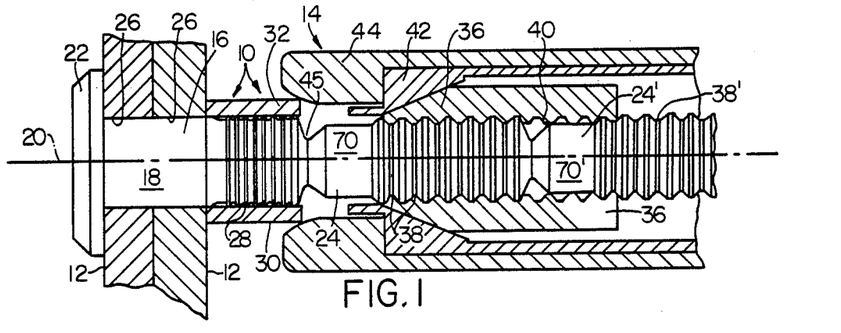
FIG. 1 is a partially cross sectioned view of conventional workpieces and prior art fastener arranged with a swaging tool just before the fastener collar is affixed on the fastener pin to secure the workpieces as a composite assembly.

The components of a typical swaged collar fastener 10 are arranged in FIG. 1 with a plurality of workpieces 12 to illustrate the relative disposition thereof when a conventional pull-type swaging tool 14 is utilized to fabricate a composite assembly 15 (shown in FIG. 2) therefrom. A fastener pin 16 having a substantially cylindrical shank 18 extending along a longitudinal axis 20 between a head 22 and a pintail 24, is disposed through aligned holes 26 in the workpieces 12. Locking grooves 28 are arranged about the longitudinal axis 20 between the head 22 and pintail 24 on the fastener pin 16 and a fastener collar 30 having a cylindrical wall 32 arranged about the longitudinal axis 20, is disposed about the fastener pin 16 at a location over the locking grooves 28.

Figure 2:
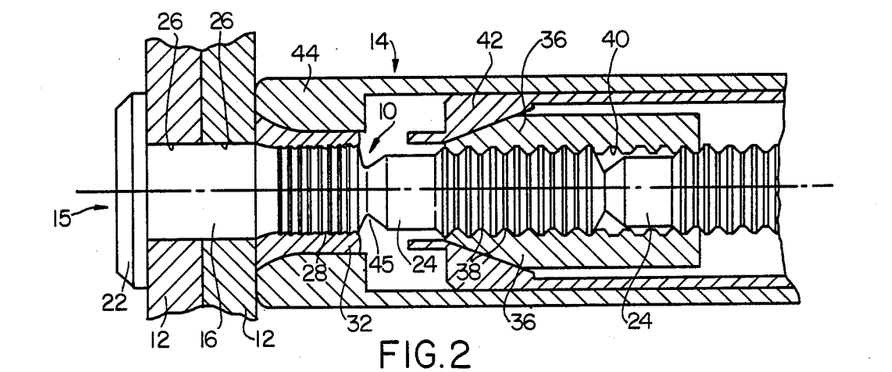
FIG. 2 is substantially the same view as FIG. 1 except it illustrates the radial compression of the fastener collar into locking grooves on the fastener pin that is accomplished by the swaging tool.

The swaging tool 14 includes jaws 36 which contract radially about the longitudinal axis 20 to grip the pintail 24. Pull grooves 38 are arranged about the longitudinal axis 20 on the pintail 24 and mesh into teeth 40 arranged on the jaws 36 when those jaws 36 are contracted by movement of a collet 42 along the longitudinal axis 20 away from the pintail 24. An axial pull is thereby exerted on the pintail 24 and a swage anvil 44 moves simultaneously with the collet 42 but in the opposite direction over the fastener collar 30 to radially compress the cylindrical wall 32 thereof into the pin locking grooves 28, as illustrated in FIG. 2. Of course, such relative movement between the collet 42 and the swage anvil 44 causes equal and opposite forces to be applied across the workpieces 12 which are thereby clinched together throughout the collar swaging operation.

A breakneck groove 45 is disposed about the longitudinal axis 20 on the fastener pin 16, between the locking grooves 28 and the pintail 24. The minimum diametral portion of the fastener pin 16 is defined by the breakneck groove 45 and as the axial pull is increased after the collar swaging operation, the yield point of the minimum diametral portion is exceeded to snap off the pintail 24.

Although the previously described collar swaging operation has been widely adopted, other swaging operations are known and include such operations for the swaged collar fastener of the invention which has no pintail 24 on the fastener pin 16. For the sake of clarity and to avoid confusion, the same numerals used to identify commonly known components and parts thereof in FIGS. 1 and 2, will be utilized hereinafter in disclosing the preferred embodiments of the invention.

In one preferred embodiment of the invention, at least one cavity 46 is arranged on the fastener collar 30 for the purpose of limiting the peak loads attained throughout the composite assembly 15 during the collar swaging operation. These cavities 46 are defined in the fastener collar 30 by at least 2 oppositely located and substantially radial portions extending into and/or through the cylindrical wall 32 thereof relative to the longitudinal axis 20. The advantage of these cavities 46 results in accordance with the principle that as compression on a material in one direction is increased, stress also builds within the material in all directions other than the direction of compression. Consequently, if the material is not somehow retained, it will flow in those other directions to limit the stress attained in the direction of compression. Therefore, by controlling the volume and number of the cavities 46, as well as the arrangement thereof on the fastener collar 30, a radial compression stress limit can be established thereby for the collar swaging operation.

It should also be appreciated from previous discussions heretofore, that the swage anvil 44 radially compresses the fastener collar 30 while moving axially thereacross. Furthermore, equal and opposite clinching forces are applied across the workpieces 12 by the fastener pin head 22 and the fastener collar 30, as a result of the relative movement between the collet 42 and swage anvil 44 in the swaging tool 14. Such clinching forces are transmitted through the fastener collar 30 in direct proportion to the radial compression stress level attained therein. Therefore, the radial compression stress limit that results from this invention serves to limit the peak loads which are applied to any part in the composite assembly 15 during the collar swaging operation.

Figure 3A:
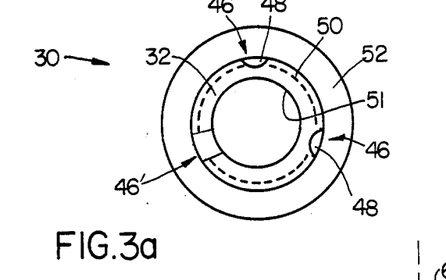
FIG. 3a is an end view of one preferred fastener collar embodiment having the cavities of the invention disposed externally thereon.
Figure 3B:
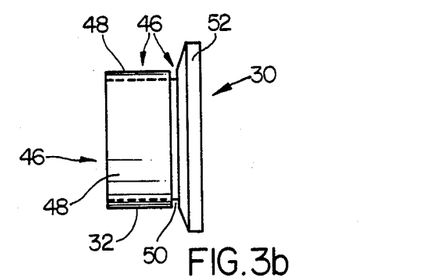
Figure 4A:
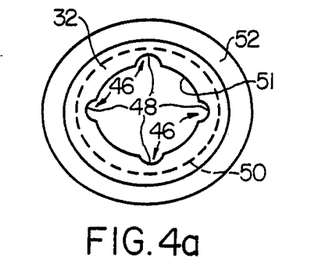
FIG. 4a is an end view of another preferred fastener collar embodiment having the cavities of the invention disposed internally thereon.
Figure 4B:
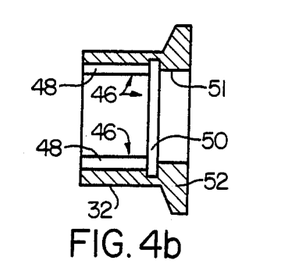
Figures 5, 6, 7, 8:
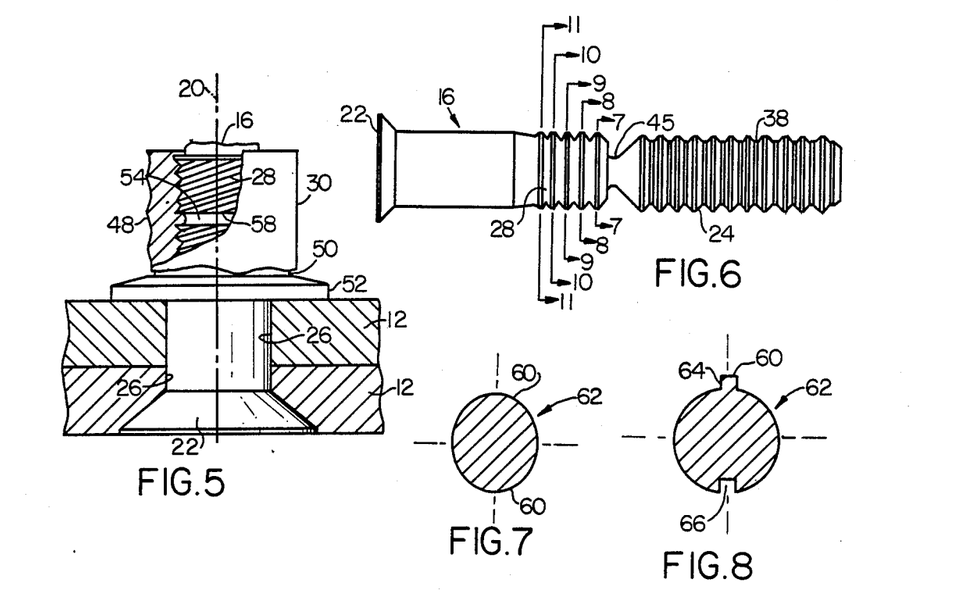
FIG. 5 is a partially cross sectioned view of one preferred composite assembly embodiment in which a plurality of inventive features are illustrated.
FIG. 6 is a side view of one preferred fastener pin embodiment having annular locking grooves disposed on at least one non-cylindrical surface portion in accordance with the invention.
FIG. 7 is a cross sectional view through one locking groove in FIG. 6 to illustrate that the non-cylindrical surface portions on the fastener pin can be elliptically contoured.
FIG. 8 is a cross sectional view through one locking groove in FIG. 6 to illustrate that the non-cylindrical surface portions on the fastener pin can be contoured as splines.

One primary consideration when arranging the cavities 46 on the fastener collar 30 is the type of collar swaging operation to be utilized. For the swaging tool 14 discussed previously in regard to FIGS. 1 and 2, the fastener collars 30 illustrated in FIGS. 3 and 4 would be most appropriate. At least one axially elongated groove 48 and at least one annular groove 50 are disposed as cavities 46 in the cylindrical wall 32 of the fastener collar 30 in both FIGS. 3 and 4. However, in FIG. 3 such grooves 48 and 50 are disposed exteriorly on the fastener collar 30, while in FIG. 4 such grooves 48 and 50 are disposed interiorly on the fastener collar 30. Of course, the cavities 46 could be disposed both exteriorly and interiorly on the fastener collar 30 and also, could penetrate through the cylindrical wall 32 thereof, as illustrated by cavity 46' in FIG. 3a. The fastener collars 30 in both FIGS. 3 and 4 have cylindrical bores 51 therethrough and include bearing flanges 52 which interface against one of the workpieces 12 in the composite assembly 15 to distribute the clinching forces thereover, as shown in FIG. 5. This flange 52 has no influence as to where the cavities 46 are located on the fastener collar 30 and constitutes no part of this invention. The annular grooves 50 on the fastener collars 30 of FIGS. 3 and 4 are located next to the flange 52 so as to be accessible to axial material flow throughout the total movement of the swage anvil 44 between the initial and final positions thereof illustrated in FIGS. 1 and 2 respectively. Such axial material flow is illustrated in FIG. 5 where material flow into the axially elongated grooves 48 is also illustrated.

Types of swaging tools are known other than the swaging tool 14 that is illustrated in FIGS. 1 and 2, and the stress limiting feature of the invention can of course be incorporated in fastener collars 30 for use with any such tool. Although the axially elongated grooves 48 would continue to be evenly spaced about the periphery of the fastener collar 30 for all other types of swaging tools, for the radially contracting type and the circumferential roll type of swaging tool, the annular grooves 50 would be evenly distributed along the longitudinal axis of the fastener collar 30. Furthermore, the annular groove 50 on the fastener collars 30 illustrated in FIGS. 3 and 4 for use with the swaging tool 14, could be extended into the flange 52 or be disposed in the flange 52, such as with an undercut (not shown).

To provide the anti-rotation feature of the invention between the fastener pin 16 and fastener collar 30, the locking grooves 28 on the fastener pin 16 are configured to have at least one abutting portion thereon for interfacing against the fastener collar 30 to preclude relative rotation therebetween when torque develops within the assembled fastener 10. One locking groove configuration for achieving the anti-rotational feature is illustrated in FIG. 5 where the locking groove 28 are helical and at least one annular groove 54 is disposed amongst the locking grooves 28 to render the helical path thereof discontinuous. Because material from the fastener collar 30 is compressed into the annular grooves 54 when the workpieces 12 are secured by the fastener 10 as illustrated in FIG. 5, each discontinuity of the locking grooves 28 at the annular groove 54 becomes an abutting portion 58 which interfaces against the fastener collar 30 when torque develops therein relative to the fastener pin 16. Furthermore, within the scope of the invention, grooves (not shown) extending parallel to the longitudinal axis 20 could be disposed into either annular or helical locking grooves 28 for obtaining discontinuities in the annular or helical path thereof.

Figure 9:
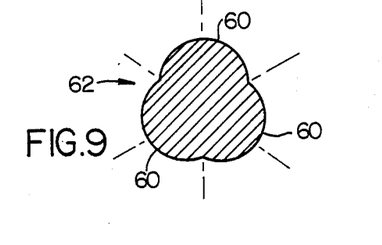
FIG. 9 is a cross sectional view through one locking groove in FIG. 6 to illustrate that the non-cylindrical surface portions on the fastener pin can be triroundularly contoured.
Figure 10:
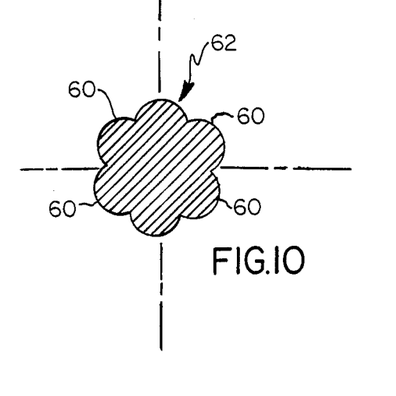
FIG. 10 is a cross sectional view through one locking groove in FIG. 6 to illustrate that the non-cylindrical surface portions on the fastener pin can have a scalloped contour.
Figure 11:
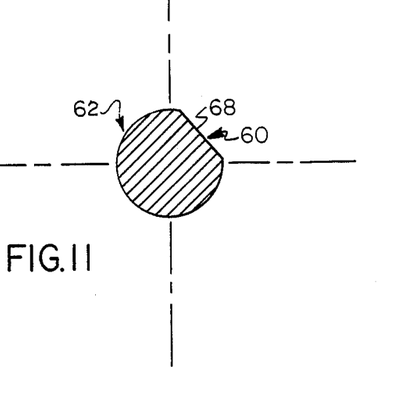
FIG. 11 is a cross sectional view through one locking groove in FIG. 6 to illustrate that the non-cylindrical surface portions on the fastener pin can be contoured as flat segments.

Another locking groove configuration for achieving the anti-rotation feature of the invention is illustrated in FIG. 6 where a fastener pin 16 similar to that illustrated in FIGS. 1 and 2 is shown to have locking grooves 28 which are annular. However, these annular locking grooves 28 are disposed into at least one non-cylindrical surface portion 60 on the fastener pin 16 and therefore, each locking groove 28 includes at least one surface eccentricity, as shown in FIGS. 7 through 11. Because material from the fastener collar 30 is compressed into the locking grooves 28 when workpieces 12 are secured by the fastener 10 as illustrated in FIG. 2, each such non-cylindrical surface portion 60 becomes an abutting portion 58 which interfaces against the fastener collar 30 when torque develops therein relative to the fastener pin 16. Because the fastener pin 16 is commonly fabricated from an extruded blank (not shown), the non-cylindrical surface portions 60 thereon can easily be incorporated as part of the extrusion process. Cross-sectional views through the crest 62 of each individual locking groove 28 are shown in FIGS. 7 through 11 to illustrate some of the contour configurations that the non-cylindrical surface portions 60 could have within the scope of the invention. For the non-cylindrical surface portions 60 of the locking groove 28 in FIG. 7, the cross sectional configuration is elliptical. Of course, the greater the difference between the major and minor diameters of the elliptical configuration, the greater is the eccentricity of the non-cylindrical surface portions 60. In FIG. 8, the non-cylindrical surface portion 60 is a spline 64 axially aligned on the fastener pin 16. Although a key type spline 64 is shown whereon adjacent faces are at right angles, the surface contour of the spline 64 could be more gradual. Furthermore, the raised surface of the spline 64 is unnecessary to the invention as also illustrated in FIG. 8 by an axially aligned key slot 66. A triroundular cross section configuration is illustrated for the non-cylindrical surface portions 60 of the locking groove 28 in FIG. 9. The non-cylindrical surface portions 60 of each round in FIG. 9 is more pronounced than necessary for most anti-rotation collar applications and any number of rounds can be utilized as illustrated in FIG. 10 where the cross section configuration is scalloped. As was discussed in regard to FIG. 8, the non-cylindrical surface portions 60 need not be raised and consequently, at least one flat 68 can be disposed therefor, as illustrated in FIG. 11.

Figure 12:
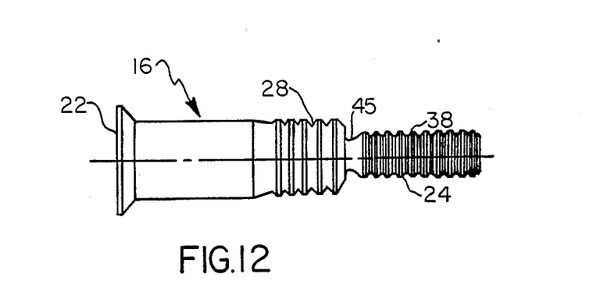
FIG. 12 is a side view of another preferred fastener pin embodiment having a pintail of substantially reduced volume.

Another preferred embodiment of the invention is illustrated in FIG. 12 where the conventional fastener pin 16 shown in FIGS. 1 and 2 is modified to have a pintail 24 of substantially reduced diameter relative to the diameter of the locking grooves 28. Because of this reduced diameter, the volume of the pintail 24 is appreciably reduced and of course, this reduction in volume is reflected in the fabricating blank of the fastener pin 16. Therefore, the cost of the material contained in each such fastener pin 16 will be reduced, especially when the material is very expensive, as is the case for titanium which is commonly the material of fasteners 10 in the aerospace industry. The pitch of the pull grooves 38 on the pintail 24 can also be reduced in proportion with the reduced diameter and if the same number of pull grooves 38 are utilized, the length of the pintail 24 will also be reduced to accomplish a further reduction in the volume of the pintail 24. However, it should be noticed that the volume of the pintail 24 reduces in proportion to the square of its reduction in radius but only in direct or linear proportion to its reduction in length. Obviously, the jaws 36 of the tool 14 must be modified for compatability with the reduced diameter of the pintail 24 and the pull grooves 38 of decreased pitch thereon. To facilitate such modifications, helical pull grooves 38 may be utilized to provide for teeth 40 on the jaws 36 that can be readily fabricated with a conventional tapping operation.

Furthermore, both material and manufacturing costs can be economized where either or both the locking grooves 28 or pull grooves 38 are machined on the fabricating blank of the fastener 10. Such economies are accomplished within the scope of this invention by rolling both the locking grooves 28 and the pull grooves 38 concurrently on the fabricating blank with a die. Such rolling produces grooves having crests of greater diameter than the diameter of the fabricating blank, which will therefore contain less material due to its reduced diameter in anticipation of such crests. Furthermore, the concurrent rolling process serves to condense groove fabrication into a single manufacturing operation. Of course, either helical or annular grooves can be rolled concurrently within the scope of this invention.

After the pintail 24 is snapped off during the collar swaging operation, it moves progressively along the axis 20 toward being ejected from the swaging tool 14 as illustrated in FIGS. 1 and 2, where it is designated pintail 24'. The fastener 10 to which the swaging tool 14 is applied, initially relocates the pintail 24' along the axis 20 to a position where it has not cleared the jaws 36. Of course, the distance pintail 24' is relocated in the jaws 36 along the axis 20 depends on the length of the pintail 24' and the particular design of the swaging tool 14. Conventionally, a land surface 70 is disposed on each pintail 24 between the pull grooves 38 and the breakneck groove 45, which can cause the tool 14 to malfunction. As can be understood by observing the portion of the pintail 24' within the jaws 36, the teeth 40 will not mesh properly into the pull grooves 38' if the land surface 70' is oversized or raised with dirt. Therefore, the jaws 36 will remain ajar and the pull force sustainable thereby on the fastener 10 to which the swaging tool 14 is applied, will be inadequate for the desired collar swaging operation. One aspect of this invention is to eliminate the land surface 70' by extending the pull grooves 38' thereover to become discontinuous at the breakneck groove 45, as shown in FIGS. 6 and 12. The teeth 40 can then mesh into the pull grooves 38' over the full length of the pintail 24' to permit the retention thereof in the jaws 36, without causing the tool 14 to malfunction when gripping the pintail 24 on the next fastener 10 to which the collar swaging operation is being applied.

From the foregoing description it should be apparent that explanations are provided therein as to how the previously stated objects of the invention are accomplished. Cavities 48 and 50 are disposed radially into the cylindrical wall 32 of the fastener collar 30 to receive material flow and thereby limit the peak loads attained throughout the composite assembly 15 when the fastener collar 30 is affixed on the fastener pin 16 during the collar swaging operation. Rotation between the fastener collar 30 and the fastener pin 16 is precluded by providing at least one abutting portion on the fastener pin locking grooves 28 for interfacing against the material of the fastener collar 30 that is swaged thereinto. Unit cost of the fastener pin 16 is reduced by decreasing both the length and diameter of the pintail 24 thereon, and by fabricating the locking grooves 28 and the pull grooves 38 concurrently with a rolling die. Malfunctioning of the swaging tool 14 is avoided by extending the full grooves 38 to eliminate the land surface 70.

What is claimed as novel is as follows:

1. A fastener for securing a composite assembly of workpieces, comprising:
    a fastener pin having a shank extending along a longitudinal axis of said fastener between a head and locking grooves about said axis; and
    a fastener collar having a substantially cylindrical wall about said axis with at least one cavity disposed therein;
    at least two workpieces being securable between said fastener pin head and said fastener collar with said fastener pin shank disposed through aligned holes in such work pieces and said fastener collar affixed to said fastener pin by radially compressing said cylindrical wall into said locking grooves, with each said cavity having a predetermined volume and being arranged on said fastener collar to receive material flowing from said cylindrical wall in non-radial directions throughout that compression operation and thereby establish a predetermined compression stress limit for that operation;
    wherein at least one of said cavities penetrates through said cylindrical wall.

2. A fastener for securing a composite assembly of workpieces, comprising:
    a fastener pin having a shank extending along a longitudinal axis of said fastener between a head and locking grooves about said axis; and
    a fastener collar having a substantially cylindrical wall about said axis with at least one cavity disposed therein;
    at least two workpieces being securable between said fastener pin head and said fastener collar with said fastener pin shank disposed through aligned holes in such work pieces and said fastener collar affixed to said fastener pin by radially compressing said cylindrical wall into said locking grooves, with each said cavity having a predetermined volume and being arranged on said fastener collar to receive material flowing from said cylindrical wall in non-radial directions throughout that compression operation and thereby establish a predetermined compression stress limit for that operation;
    wherein said cavities are disposed into the exterior surface of said cylindrical wall and said cavities are elongated grooves parallel to said axis.

3. A fastener for securing a composite assembly of workpieces, comprising;
    a fastener pin having a shank extending along a longitudinal axis of said fastener between a head and locking grooves about said axis; and
    a fastener collar having a substantially cylindrical wall about said axis with at least one cavity disposed therein;
    at least two workpieces being securable between said fastener pin head and said fastener collar with said fastener pin shank disposed through aligned holes in such workpieces and said fastener collar affixed to said fastener pin by radially compressing said cylindrical wall into said locking grooves, with each said cavity having a predetermined volume and being arranged on said fastener collar to receive material flowing from said cylindrical wall in non-radial directions throughout that compression operation and thereby establish a predetermined compression stress limit for that operation.
wherein said cavities are disposed into the exterior surface of said cylindrical wall and said cavities are both annular grooves about said axis and elongated grooves parallel to said axis.

4. A fastener for securing a composite assembly of workpieces, comprising;
   a fastener pin having a shank extending along a longitudinal axis of said fastener between a head and locking grooves about said axis; and
   a fastener collar having a substantially cylindrical wall about said axis with at least one cavity disposed therein;
   at least two workpieces being securable between said fastener pin head and said fastener collar with said fastener pin shank disposed through aligned holes in such work pieces and said fastener collar affixed to said fastener pin by radially compressing said cylindrical wall into said locking grooves, with each said cavity having a predetermined volume and being arranged on said fastener collar to receive material flowing from said cylindrical wall in non-radial directions throughout that compression operation and thereby establish a predetermined compression stress limit for that operation;
   wherein said cavities are disposed into the interior surface of said cylindrical wall.

5. The fasteners of claim 4 wherein said cavities are annular grooves about said axis.

6. The fastener of claim 4 wherein said cavities are elongated grooves parallel to said axis.

7. The fastener of claim 4 wherein said cavities are both annular grooves about said axis and elongated grooves parallel to said axis.

8. A fastener for securing a composite assembly of workpieces, comprising:
   a fastener pin having a shank extending along a longitudinal axis of said fastener between a head and locking grooves about said axis; and
   a fastener collar having a substantially cylindrical wall about said axis with at least one cavity disposed therein;
   at least two workpieces being securable between said fastener pin head and said fastener collar with said fastener pin shank disposed through aligned holes in such work pieces and said fastener collar affixed to said fastener pin by radially compressing said cylindrical wall into said locking grooves, with each said cavity having a predetermined volume and being arranged on said fastener collar to receive material flowing from said cylindrical wall in non-radially directions throughout that compression operation and thereby establish a predetermined compression stress limit for that operation;
   wherein said cavities are disposed into both the exterior and interior surfaces of said cylindrical wall.

9. The fastener of claim 8 wherein said cavities are annular grooves about said axis.

10. The fastener of claim 8 wherein said cavities are elongated grooves parallel to said axis.

11. The fastener of claim 8 wherein said cavities are both annular grooves about said axis and elongated grooves parallel to said axis.

12. A fastener collar, comprising:
   a substantially cylindrical wall about a longitudinal axis through said fastener collar and having at least one cavity disposed therein;
   said collar being positionable about locking grooves disposed on a fastener pin and affixable thereto by radially compressing said cylindrical wall into such locking grooves, each said cavity having a predetermined volume and being arranged on said fastener collar to receive material flowing from said cylindrical wall in non-radial directions throughout that compression operation and thereby establish a predetermined compression stress limit for that operation;
   wherein at least one of said cavities penetrates through said cylindrical wall.

13. A fastener collar, comprising:
   a substantially cylindrical wall about a longitudinal axis through said fastener collar and having at least one cavity disposed therein;
   said collar being positionable about locking grooves disposed on a fastener pin and affixable thereto by radially compressing said cylindrical wall into such locking grooves, each said cavity having a predetermined volume and being arranged on said fastener collar to receive material flowing from said cylindrical wall in non-radially directions throughout that compression operation and thereby establish a predetermined compression stress limit for that operation;
   wherein said cavities are disposed into the exterior surface of said cylindrical wall and said cavities are elongated grooves parallel to said axis.

14. A fastener collar, comprising:
   a substantially cylindrical wall about a longitudinal axis through said fastener collar and having at least one cavity disposed therein;
   said collar being positionable about locking grooves disposed on a fastener pin and affixable thereto by radially compressing said cylindrical wall into such locking grooves, each said cavity having a predetermined volume and being arranged on said fastener collar to receive material flowing from said cylindrical wall in non-radial directions throughout that compression operation and thereby establish a predetermined compression stress limit for that operation;
   wherein said cavities are disposed into the exterior surface of said cylindrical wall and said cavities are both annular grooves about said axis and elongated grooves parallel to said axis.

15. A fastener collar, comprising:
   a substantially cylindrical wall about a longitudinal axis through said fastener collar and having at least one cavity disposed therein;
   said collar being positionable about locking grooves disposed on a fastener pin and affixable thereto by radially compressing said cylindrical wall into such locking grooves, each said cavity having a predetermined volume and being arranged on said fastener collar to receive material flowing from said cylindrical wall in non-radial directions throughout that compression operation and thereby establish a predetermined compression stress limit for that operation;
   wherein said cavities are disposed into the interior surface of said cylindrical wall.

16. The fastener collar of claim 15 wherin said cavities are annular grooves about said axis.

17. The fastener collar of claim 15 wherin said cavities are elongated grooves parallel to said axis.

18. The fastener collar of claim 15 wherin said cavities are both annular grooves about said axis and elongated grooves parallel to said axis.

19. A fastener collar, comprising:
- a substantially cylindrical wall about a longitudinal axis through said fastener collar and having at least one cavity disposed therein;
- said collar being positionable about locking grooves disposed on a fastener pin and affixable thereto by radially compressing said cylindrical wall into such locking grooves, each said cavity having a predetermined volume and being arranged on said fastener collar to receive material flowing form said cylindrical wall in non-radial directions throughout that compression operation and thereby establish a predetermined compression stress limit for that operation;
- wherein said cavities are disposed into both the exterior and interior surfaces of said cylindrical wall.

20. The fastener collar of claim 19 wherein said caviities are annular grooves about said axis.

21. the fastener collar of claim 19 wherein said cavities are elongated grooves parallel to said axis.

22. The fastener collar of cliam 19 wherein said cavities are both annular grooves about said axis and elongated grooves parallel to said axis.

23. A composite assembly, comprising:
- at least two workpieces having aligned holes therebetween at no less than one location on said composite assembly;
- a fastener pin for each location of aligned holes, each said fastener pin having a shank extending along a longitudinal axis between a head and locking grooves about said axis;
- a fastener collar for each location of aligned holes, each said fastener pin having a shank extending along a longitudinal axis between a head and locking grooves about said axis;
- a fastener collar for each location of aligned holes, each said fastener collar having a substantially cylindrical wall about said axis with at least one cavity disposed therein;
- said workpieces being secured between said fastener pin head and said fastener collar at each location of aligned holes, with said fastener pin shank disposed through said aligned holes and said fastener collar affixed to said fastener pin with said cylindrical wall radially compressed into said locking grooves, each said cylindrical wall cavity having a predetermined volume and being arranged on said fastener collar to receive material flowing form said cylindrical wall in non-radial directions throughout the cylindrical wall compression operation to thereby establish a predetermined compression stress limit thereto;
- wherein at least one of said cavities in each said fastener collar penetrates through said cylindrical wall thereof.

24. A composite assembly, comprising:
- at least two workpieces having aligned holes therebetween at no less than one location on said cOmposite assembly;
- a fastener pin for each location of aligned holes, each said fastener pin having a shank extending along a longitudinal axis between a head and locking grooves about said axis;
- a fastener collar for each location of aligned holes, each said fastener collar having a substantially cylindrical wall about said axis with at least one cavity disposed therein;
- said workpieces being secured between said fastener pin head and said fastener collar at each location of aligned holes, with said fastener pin shank disposed through said aligned holes and said fastener collar affixed to said fastener pin with said cylindrical wall radially compressed into said locking grooves, each said cylindrical wall cavity having a predetermined volume and being arranged on said fastener collar to receive material flowing from said cylindrical wall in non-radial directions throughout the cylindrical wall compression operation to thereby establish a predetermined compression stress limit thereto;
- wherein said cavities are disposed into the exterior surface of said cylindrical wall and said cavities are elongated grooves parallel to said axis.

25. A composite assembly, comprising;
- at least two workpieces having aligned holes therebetween at no less than one location on said composite assembly;
- a fastener pin for each location of aligned holes, each fastener pin having a shank extending along a longitudinal axis between a head and locking grooves about said axis;
- a fastener collar for each location of aligned holes, each said fastener collar having a substantially cylindrical wall about said axis with at least one cavity disposed therein;
- said workpieces being secured between said fastener pin head and said fastener collar at each location of aligned holes, with said fastener pin shank disposed through said pin with said cylindrical wall radially compressed into said locking grooves, each said cylindrical wall cavity having a predetermined volume and being arranged on said fastener collar to receive material flowing from said cylindrical wall in non-radial directions throughout the cylindrical wall compression operation to thereby establish a predetermined compression stress limit therefore;
- wherein said cavities are disposed into the exterior surface of said cylindrical wall and said cavities are both annular grooves about said axis and elongated grooves parallel to said axis.

26. A composite assembly, comprising:
- at least two workpieces having aligned hole therebetween at no less than one location on said cOmposite assembly;
- a fastener pin for each location of aligned holes, each said fastener pin having a shank extending along a longitudinal axis between a head and Locking grooves about said axis;
- a fastener collar for each location of aligned holes, each said fastener collar having a substantially cylindrical wall about said axis with at least one cavity disposed therein;
- said workpiece being secured between said fastener pin head and said fastener collar at each location of aligned holes, with said fastener pin shank disposed through said aligned holes and said fastener collar affixed to said fastener pin with said cylindrical wall radially compressed into said locking grooves, each said cylindrical wall cavity having predetermined volume and being arranged on said fastener collar to receive material flowing from said cylindrical wall in non-radial directions throughout the cylindrical wall compression operation to thereby establish a predetermined compression stress limit thereto;

27. The composite assembly of claim 26 wherin said cavities are annular grooves about said axis.

28. The composite assembly of claim 26 wherin said cavities are elongated grooves parallel to said axis.

29. The composite assembly of claim 26 wherein said cavities are both annular grooves about said axis and elongated grooves parallel to said axis.

30. A composite assembly, comprising;
at least two workpieces having aligned holes therebetween at no less than one location on said composite assembly;
a fastener pin for each location of aligned holes, each said fastener pin having a shank extending along a longitudinal axis between a head and locking grooves about said axis;
a fastener collar for each location of aligned holes, each said fastener collar having a substantially cylindrical wall about said axis with at least one cavity disposed therein;
said workpieces being secured between said fastener pin head and said fastener collar at each location of aligned holes, with said fastener pin shank disposed through said aligned holes and said fastener collar affixed to said fastener pin with said cylindrical wall radially compressed into said locking grooves, each said cylindrical wall cavity having a predetermined volume and being arranged on said fastener collar to receive material flowing form said cylindrical wall in non-radial directions throughout the cylindrical wall compression operation to thereby establish a predetermined compression stress limit thereto;
wherein said cavities are disposed into both the exterior and interior surfaces of said cylindrical wall 31. The composite assembly of claim 30 wherein said cavities are annular grooves about said axis.

32. The composite assembly of claim 30 wherein said cavities are elongated grooves parallel to said axis.

33. The composite assembly of claim 30 wherein said cavities are both annular grooves about said axis and elongated grooves parallel to said axis.

* * * * *